No. 755,456. PATENTED MAR. 22, 1904.
W. COGER.
AUTOMATIC CUT-OFF FOR GLASS TUBE WATER GAGES.
APPLICATION FILED NOV. 5, 1903.
NO MODEL.
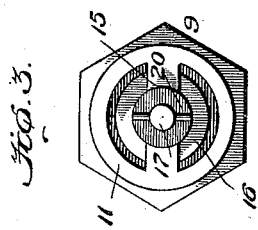
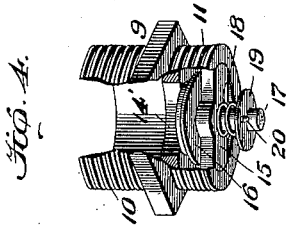
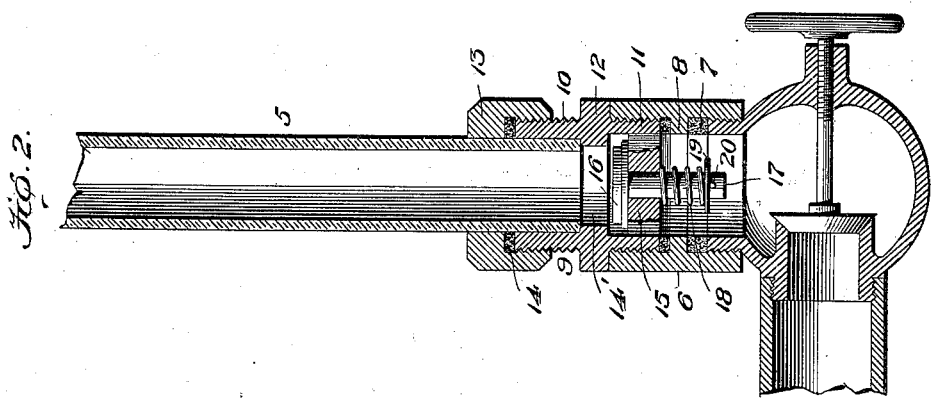
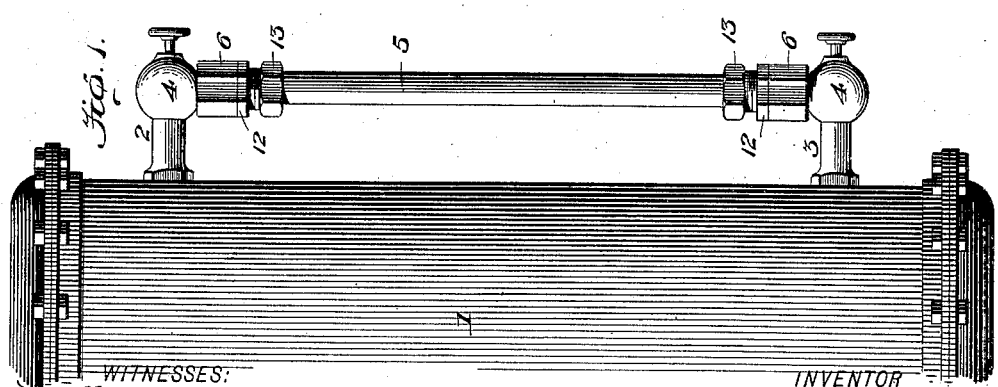
WITNESSES:
INVENTOR
Walter Coger
BY
Henry N. Copp
his ATTORNEY
THE NORRIS PETERS CO., PHOTO-LITHO., WASHINGTON, D. C.

No. 755,456. Patented March 22, 1904.

UNITED STATES PATENT OFFICE.

WALTER COGER, OF BISBEE, ARIZONA TERRITORY.

AUTOMATIC CUT-OFF FOR GLASS-TUBE WATER-GAGES.

SPECIFICATION forming part of Letters Patent No. 755,456, dated March 22, 1904.

Application filed November 5, 1903. Serial No. 179,980. (No model.)

To all whom it may concern:

Be it known that I, WALTER COGER, a citizen of the United States, residing at Bisbee, county of Cochise, and Territory of Arizona, have invented certain new and useful Improvements in Automatic Cut-Off Glass-Tube Water-Gages for Steam-Boilers, of which the following is a specification.

My invention relates to automatic cut-off glass-tube water-gages for steam-boilers.

The object of the present invention is to provide an improved automatically-acting cut-off valve for use in connection with glass-tube water-gages, which will normally remain open and permit the rise and fall of the water in the glass tube of the gage, as usual in gages, and which will automatically close by the pressure of the steam should the glass break, thereby shutting off the steam-pressure and preventing any injury or scalding of any person near the water-gage and making it convenient to shut off the steam-pressure without danger of injury in the regular way by the use of the ordinary globe-valve used on gages of this class.

The invention consists in the improved form of valve as combined with the water-gage, and particularly in the novel features and combinations of parts set forth fully hereinafter and embodied in the appended claim.

In the accompanying drawings, Figure 1 is an exterior view of a glass-tube water-gage equipped with my invention and applied to a boiler; Fig. 2, a detail vertical section of the valve mechanism; Fig. 3, a detail bottom view looking toward the valve-casing, the coupling or union being removed; and Fig. 4, a detail perspective view of the valve and its casing, certain parts of the latter being broken away.

The numeral 1 represents a boiler provided with the fittings 2 and 3 and globe-valve 4, as usual, by means of which the flow into the gage-glass 5 can be controlled. On the fittings 2 and 3 are screwed the nuts 6. The construction being the same at both ends of the gage-glass, a description of the parts at one end only will be given. The coupling or union 6 has a suitable gasket 7, bearing against an internal flange 8, integral with the union 6. The valve shell or casing 9 is formed with inner and outer screw-threaded portions 10 and 11 and an intermediate integral nut 12, the threaded portion 10 receiving the end of the glass gage-tube, and an internally-threaded nut 13 engaging with said portion 10 and provided with a suitable gasket 14, while the outer threaded portion 11 is screwed into the coupling or union 6 and bears against the internal flange or shoulder 8. Within the valve-casing 9 is a valve-seat 14, and extending transversely of the casing is a bar 15, which is rigid with the casing.

The numeral 16 designates a valve of a size to properly fit the seat 14 and provided with a stem 17, slidable through the bar 15 and encircled by a coil-spring 18, which bears on a washer 19, held by a cotter-pin 20. The tendency of the spring is to keep the valve normally unseated, and its tension is such that the valve will not seat under ordinary conditions. When, however, the gage-glass breaks, the pressure of the steam entering the valve-casing automatically closes the valve against its seat in opposition to the tension of its spring, and thus prevents the steam from escaping through the broken gage-glass. This action takes place immediately upon the breaking of the gage-glass.

The operation of both valves is the same. After the valves have closed the globe-valves 4 can be closed at leisure in the usual manner.

The invention is a safeguard against injury to any person near a gage-glass in case of the breaking thereof and is adapted to be applied to the ordinary gage-glass.

Having thus described my invention, what I claim as new, and desire to secure by Letters Patent, is—

In an automatic cut-off valve for glass boiler water-gages, the combination with a boiler-fitting and a valve controlling the same, of a glass tube, a removable valve-casing which receives the end of the glass tube and has a shoulder to support the glass tube and having a bridge across its interior beyond the end of the glass tube, a spring-actuated valve having a stem slidable through the bridge, said valve being adapted to seat, under pressure, in the valve-casing, and a coupling or union detachably connected to the boiler-fitting and to the valve-casing.

In testimony whereof I hereunto affix my signature in presence of two witnesses.

WALTER COGER.

Witnesses:
　GILES B. CAPRON,
　W. D. KINSEY.